March 17, 1970    JEAN-CLAUDE PRETI    3,501,763
METHOD OF MEASURING THE SPACING OF TWO MOVING VEHICLES AND A
DEVICE FOR THE PERFORMANCE THEREOF, AND THEIR APPLICATION
TO THE EVALUATION OF THE TRAFFIC DENSITY OF VEHICLES
Filed Jan. 12, 1968

INVENTOR:
JEAN-CLAUDE PRETI
by
Browne, Schuyler + Beveridge,
Attorneys

United States Patent Office 3,501,763
Patented Mar. 17, 1970

3,501,763
METHOD OF MEASURING THE SPACING OF TWO MOVING VEHICLES AND A DEVICE FOR THE PERFORMANCE THEREOF, AND THEIR APPLICATION TO THE EVALUATION OF THE TRAFFIC DENSITY OF VEHICLES
Jean-Claude Preti, Clamart, France, assignor to Societe de Fabrication d'Instruments de Mesure (S.F.I.M.), Massy, Essonne, France, a company of France
Filed Jan. 12, 1968, Ser. No. 697,449
Claims priority, application France, Jan. 13, 1967, 91,023; June 2, 1967, 108,876
Int. Cl. G01s 9/42
U.S. Cl. 343—12
9 Claims

ABSTRACT OF THE DISCLOSURE

A Doppler effect radar detector detects the passage of a vehicle and emits Doppler signals the frequency of which represents the speed of the vehicle, and a count pulse that represents the passage of the vehicle.

Figure 1:
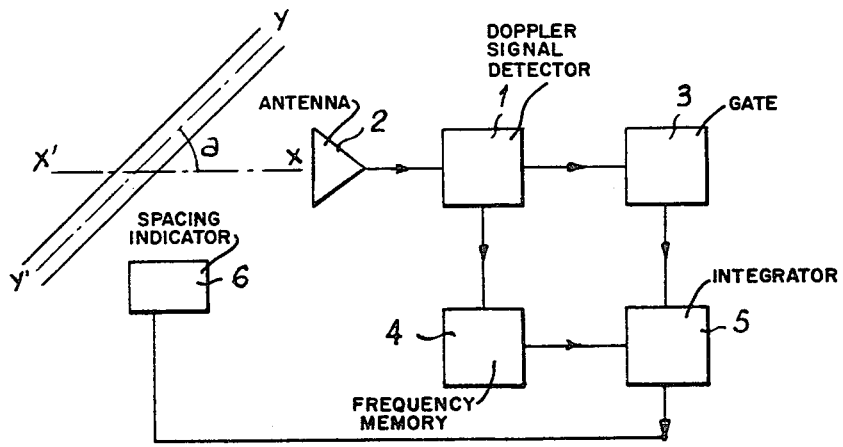

For measuring the spacing of successive vehicles, the Doppler signals are fed to a memory circuit which emits memory signals which are counted by an integrator, and the count pulses are fed to a gate which resets the integrator to zero after the passage of each vehicle.

For measuring traffic density, the Doppler signals are fed to a memory circuit which emits memory signals, and the count pulses are fed to a digital divider which changes state after the reception of each N pulses. An integrator is connected to the memory circuit via a gate which is connected to the divider so as to feed the memory signals to the integrator from the passage of the first vehicle until the passage of the Nth vehicle.

---

The present invention relates to a method of measuring the spacing of two moving vehicles and a device for the performance of this method, and the application of the method and device to the evaluation of the traffic density of vehicles moving along a traffic way.

It is known to detect the passage of a vehicle into a zone by means of a radar detection apparatus, and it is also known to measure the speed of passage of the vehicle by making use of a Doppler effect radar detector.

From British patent specification No. 979,621 it is already known to measure the spacing of two vehicles, these being railway vehicles, by forming a Doppler detection beam on the path of the cars and counting the number of passages through zero of the Doppler frequency signal, representing the speed of the car, up to the instant of detection of the following car.

A disadvantage of this method is that it requires the first car detected to be still in the detecting beam at the instant when the following car is detected.

For this reason, it is difficult to apply such a method to the case of road vehicles, which are capable of moving at high speed and may be separated by distances such that they cannot be covered by a detecting beam.

The object of the present invention is to eliminate the above-mentioned disadvantage.

With this object, the invention provides a method in which an electromagnetic detecting beam is formed in known manner on the path of the vehicles by means of a Doppler effect radar apparatus which upon the passage of a vehicle into the beam produces an output Doppler signal the frequency of which represents the speed of passage of the vehicle, the method being characterised by the feature that the Doppler signal is used to bring about, from the commencement of the detection of the vehicle up to the commencement of the detection of the following vehicle, the permanent emission of a memory signal similar to the Doppler signal emitted by the radar apparatus by reason of the detection of the said vehicle, and by the feature that this memory signal is integrated.

The theoretical justification of this method is easily deduced from the following considerations:

As is known, a vehicle having a speed $v$ and crossing at an angle $a$ the beam of a Doppler radar apparatus having an emission wave length $l$, causes the formation of an output Doppler signal having a frequency $f$ given by the expression $$f = \frac{2v \cos a}{l}$$

This signal continues as long as the vehicle is in the radar beam, and it then disappears, a further signal appearing only upon the passage of a further vehicle into this beam.

If we call $t_0$ the time at which the detection of the first vehicle commenced and $t_1$ the time at which the detection of the second vehicle commenced, and if we assume that the speed of the first vehicle has remained constant during the period of time $(t_1 - t_0)$, the distance D between the two vehicles is given by the expression $$D = \int_{t_0}^{t_1} v\, dt$$

By replacing the value of $v$ in this expression by a function of the frequency $f$ of the Doppler signal, the following expression is obtained for the distance between the vehicles $$D = \int_{0t}^{t_1} \frac{fl}{2 \cos a}\, dt$$

Or replacing the frequency by the number N of alternations of the signal per unit of time $$D = \frac{Nl}{2 \cos a}$$

By a simple integration of the memory signal having the characteristics of the signal emitted by the detecting radar, between the commencement of the detection of the first vehicle and the commencement of the detection of the second vehicle, N is known and hence D can be deduced from the above expression.

This method is applicable to the evaluation of the density of vehicular traffic.

By "density" is here meant the ratio of a number of vehicles to the length of roadway occupied by these vehicles, that is to say the number of vehicles per unit of length.

This ratio is significant of the traffic and a knowledge of it is useful in determining the optimal cycle of operations of traffic signals. It is preferred to mere knowledge of the number of passages of vehicles in a given time and to a knowledge of the mean speed of the vehicles, since the number of passages or the mean speed do not permit convenient appreciation of the traffic under all traffic conditions from saturation to very light traffic.

The method of measuring spacing described above enables a measure of the density to be obtained in a simple manner without its performance requiring the use of an expensive computer, in contrast with known methods.

In accordance with the present invention, in order to measure the density of traffic on a roadway an electromagnetic detecting beam is formed on the path of the vehicles by means of a Doppler effect radar apparatus, and the spacing between a first vehicle entering the beam and the following vehicle is measured by a method in accordance with the one described, then the spacing between the said following vehicle and a third vehicle that enters the beam is measured in similar manner, and so on until the successive spacings between a given number of vehicles have been measured, these spacings being added together and their sum representing the length of roadway occupied by this number of vehicles.

The method of measuring the spacing and the method of measuring the traffic density are easily performed by simple devices which may incorporate electronic elements known in themselves.

Figure 2:
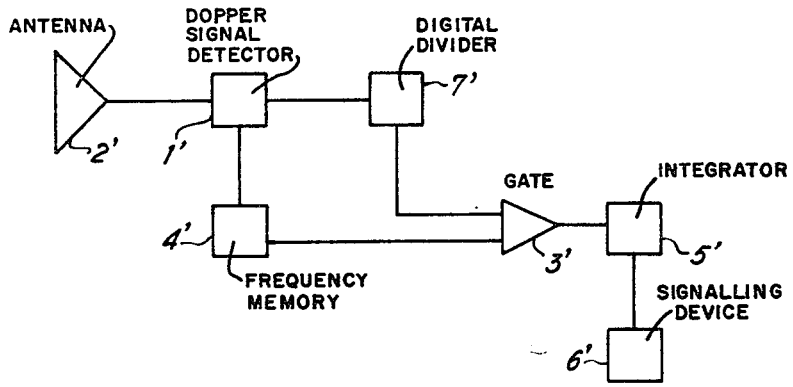

In the accompanying drawing, FIG. 1 is a block diagram of a device for measuring spacing, and FIG. 2 is a block diagram of a device for measuring the density of traffic.

In FIG. 1, the device for measuring the spacing between two vehicles following one another on a roadway comprises a Doppler effect radar detector 1 mounted with its antenna 2 emitting a beam with axis X'X cutting the roadway, the axis of which is Y'Y, at an angle $a$ so as the detect the passage of each vehicle and hence emit Doppler signals of a frequency representing the speed of passage of the detected vehicle, and a count pulse representing the passage of the vehicle, a frequency memory circuit 4 connected to the said detector so as to receive the said Doppler signals and hence to emit memory signals identical with the Doppler signals, an integrator 5 connected to the said memory circuit so as to count the said memory signals, and a gate 3 connected to the said detector and to the said integrator so as to receive the said count pulse and hence to reset the integrator to zero after each passage of a vehicle.

The detecting radar apparatus does not need to be described in detail, seeing that this type of radar apparatus is now well known to persons skilled in the art. Reference may be made for example to French patent specification Nos. 1,349,431 and 1,373,123, it being understood that these examples are not limiting.

The frequency memory circuit 4 which is set in operation by the Doppler signal and which furnishes the memory signals is advantageously of the type described in French patent application No. 77,097 filed Sept. 21, 1966.

The integrator 5 may be either an analog system delivering a signal the amplitude of which is proportional to the spacing D between the two successive vehicles detected by the radar apparatus, or a digital system delivering a binary number representing this spacing.

The integrator 5 is connected to a device 6, which may be a spacing indicator and/or an alarm device and/or a device for supervising the density of the traffic. In fact, the invention is not limited to any particular use of the spacing information furnished by the method, with this fundamental advantage, that this information takes into account both the speed of the first vehicle through the intermediary of the Doppler frequency and the speed of the second vehicle through the intermediary of the period of integration, which is moreover longer than the time taken by this vehicle to arrive in the beam of the detecting radar apparatus.

In FIG. 2, the device for measuring the traffic density of vehicles passing along a roadway comprises a Doppler effect radar detector 1' with its antenna 2', for detecting the passage of each vehicle and hence emitting Doppler signals of a frequency representing the speed of passage of the detected vehicle, and a count pulse representing the passage of the detected vehicle, a frequency memory circuit 4' connected to the said detector so as to receive the said Doppler signals and hence to emit memory signals identical with the received Doppler signals, a digital divider 7' connected to the said detector so as to receive each count pulse and to change state whenever an arbitrary number N of count pulses representing the passage of N vehicles have been transmitted to it, and an integrator 5' connected to the said memory circuit through the intermediary of a gate 3' connected to the said digital divider so as to feed the said memory signals to the integrator from the passage of the first vehicle until that of the Nth vehicle.

The number of pulses summed in the integrator therefore represents the sum of the spacings between the cars, that is to say the length of roadway occupied by the N vehicles.

This length may be expressed in the form of a number or an analog voltage, and if desired an alarm, indicating or controlled signalling device 6' may be connected to the output of the integrator so as to put into effect the information supplied by this.

It will be understood that in all the foregoing specification the word "vehicle" is to be interpreted as meaning broadly a discontinuous moving body, which may for example be a car or other object.

What is claimed is:

1. In the measurement of concentration of vehicles on a path the method of measuring the spacing between two vehicles following one another on said path, comprising the steps of:
    detecting the passage of the first vehicle through a beam crossing said path by the formation of a Doppler signal which appears when the first vehicle enters the beam and which disappears when said first vehicle is no longer in the beam, said Doppler signal having a frequency proportionate to the speed of said passage,
    using said Doppler signal for producing a memory signal as the vehicle departs from the beam having the same frequency as the Doppler signal and for ordering the integration of said memory signal,
    detecting the passage of the following vehicle through said beam by the formation of a Doppler signal which appears when the said vehicle enters the beam, and
    using said last mentioned signal for stopping the integration of said memory signal, whereby said integration gives a number of alternations which is proportionate to said spacing.

2. Method for obtaining a measure of the traffic density of vehicles following one another on a path, comprising the steps of:
    measuring the spacing between each vehicle and the following one, from the first vehicle to the last one of a number of vehicles, by a method according to claim 1,
    integrating said spacings for obtaining a sum of spacings, and
    dividing said sum by said number for obtaining said measure of the traffic.

3. A device for measuring the spacing between two successive vehicles on a roadway, comprising a Doppler effect radar detector for detecting the passage of each vehicle including means emitting Doppler signals of a frequency representing the speed of passage of the detected vehicle and a count pulse representing the passage of the vehicle, a memory connected to the said detector so as to receive the said Doppler signals and hence emit memory signals successively integratable and identical with the Doppler signals after passage of a first vehicle until the next vehicle passes, an integrator connected to the said memory circuit so as to count the said memory signals, and a gate connected to the said detector and to said integrator so as to receive said count pulse and hence to reset the integrator to zero after each passage of a vehicle.

4. A device for measuring the traffic density of vehicles passing along a roadway, comprising a Doppler effect radar detector for detecting the pasage of each vehicle including emitting Doppler signals of a frequency representing the speed of passage of the detected vehicle and a count pulse representing the passage of the detected vehicle, a frequency memory circuit connected to the said detector so as to receive the said Doppler signals and hence emit time integratable memory signals identical with the received Doppler signals, a digital divider connected to the said detector so as to receive each count pulse and to change state whenever N count pulse representing the passage of N vehicles have been transmitted to it, and an integrator connected to the said memory circuit through the intermediary of a gate connected to the said digital divider so as to feed the said memory signals to the integrator after passage of the N−1 vehicle until passage of the Nth vehicle.

5. A device for measuring the spacing between two successive vehicle on a roadway, comprising a Doppler effect radar detector for detecting the passage of each vehicle and hence emitting Doppler signals of a frequency representing the speed of passage of the detected vehicle and a count pulse representing the passage of the vehicle, a memory circuit connected to the said detector so as to receive the said Doppler signals and hence emit memory signals identical with the Doppler signals, an integrator connected to the memory circuit so as to count the said memory signals and a gate connected to the said detector and to the said integrator so as to receive said count pulse and hence to reset the integrator to zero after each passage of a vehicle, said integrator being an analog system for delivering this signal the amplitude of which is proportional to the spacing between two successive vehicles.

6. A device for measuring the spacing between two successive vehicles on a roadway, comprising a Doppler effect radar detector for detecting the passage of said vehicle and hence emitting Doppler signals of a frequency representing the speed of passage of the detected vehicle and a count pulse representing the passage of the vehicle, a memory circuit connected to the said detector so as to receive the said Doppler signals and hence emit memory signals identical with the Doppler signals, an integrator connected to the memory circuit so as to count the same memory signals and a gate connected to the said detector and to the said integrator so as to receive said count pulse and hence to reset the integrator to zero after each passage of a vehicle, said integrator being a digital system for deliverying a binary number representing the spacing between two successive vehicles.

7. Device according to claim 3, characterised in that the said integrator is connected to an indicating device.

8. Device according to claim 4, characterised in that the said integrator is an analog computer.

9. Device according to claim 4, characterised in that the said integrator is a digital computer.

References Cited

UNITED STATES PATENTS

| | | | |
|---|---|---|---|
| 3,072,901 | 1/1963 | Ruppersberg | 340—38 X |
| 3,161,876 | 12/1964 | Barker | 340—38 X |
| 3,341,848 | 9/1967 | Niedier | 340—38 X |

RODNEY D. BENNETT, Jr., Primary Examiner

J. P. MORRIS, Assistant Examiner

U.S. Cl. X.R.

340—38